No. 789,935. PATENTED MAY 16, 1905.
G. B. PICKOP.
SWIVEL CONNECTION FOR PIPES.
APPLICATION FILED FEB. 20, 1905.
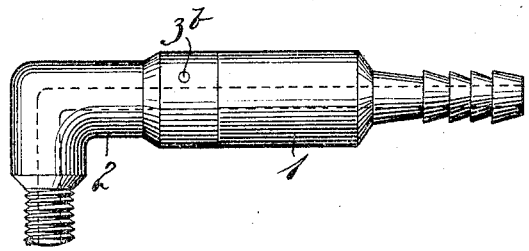
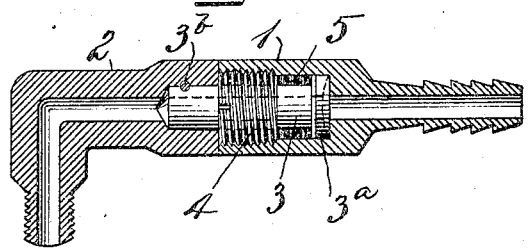
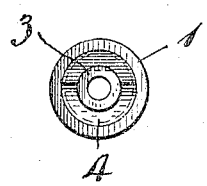

No. 789,935. Patented May 16, 1905.

UNITED STATES PATENT OFFICE.

GEORGE B. PICKOP, OF NEW BRITAIN, CONNECTICUT, ASSIGNOR TO P. & F. CORBIN, OF NEW BRITAIN, CONNECTICUT, A CORPORATION OF CONNECTICUT.

SWIVEL CONNECTION FOR PIPES.

SPECIFICATION forming part of Letters Patent No. 789,935, dated May 16, 1905.

Application filed February 20, 1905. Serial No. 246,478.

*To all whom it may concern:*

Be it known that I, GEORGE B. PICKOP, a citizen of the United States, residing at New Britain, county of Hartford, and State of Connecticut, have invented certain new and useful Improvements in Swivel Connections for Pipes, of which the following is a full, clear, and exact description.

My invention relates to improvements in swivel connections for hose, the same being particularly useful in connection with air-hose.

The object of the invention is to provide a swivel connection which will effectively prevent leakage.

In the drawings, Figure 1 is a side elevation. Fig. 2 is a longitudinal section. Fig. 3 is an end view of one of the parts, the other part being removed.

1 is one section of the coupling. 2 is the other section.

3 is a tubular connection, the body of which is of less diameter than the bore of the section 1. $3^a$ is a head on said connecting portion 3 of a size corresponding substantially to the bore of the section 1.

4 is a gland fitting into the internally-screw-threaded end of the bore of the section 1.

5 represents packing arranged between the gland 4 and the head of the connection 3.

The length of the connection 3 is such that it projects beyond the end of the section 1, as best seen in Fig. 2.

Section 2 has a bore arranged to receive the projecting end of the connection 3.

The method of uniting the section 2 with the projecting end of the connection 3 is immaterial so long as it is air-tight. One simple means comprises making the connection slightly tapered, as indicated in Fig. 2, and then pinning the same together, for example, by the pin $3^b$. Another effective method would be to unite said parts by the method known as "sweating" or soldering, which comprises applying a thin coating of solder to the surfaces to be united, then placing them together, and subjecting them to sufficient heat to cause the solder to flow.

By my invention it will be seen that an effective swivel-joint is made, since the connecting portion is free to turn and yet cannot be withdrawn because of the headed enlargement $3^a$ being held in place by the packing 5 and the gland 4. In the arrangement shown it is impossible for any one to tamper with the gland. Furthermore, the gland cannot work loose, since the end of the section 2 bears against the same in a direction to resist against the tendency on the part of the gland to be unscrewed while the connection 3 is being turned. An appliance of this character is not limited to any particular field of usefulness, but will be found particularly advantageous in hose connections provided to conduct air under heavy pressure.

What I claim is—

A swivel connection for hose and the like comprising two main sections, an intermediate connection, said connection having an enlarged head at one end located within the bore of one of said sections, a gland tightly in said section, a packing between said gland and said head, the other section being secured on the projecting end of said connection opposite the headed end and abutting against the inclosing section.

GEORGE B. PICKOP.

Witnesses:
G. ERNEST ROOT,
C. I. KELSEY.